June 3, 1958   F. I. STEWART   2,836,983
POWERED UNIT FOR ENDLESS CONVEYOR CABLES
Filed Sept. 18, 1956   3 Sheets-Sheet 1
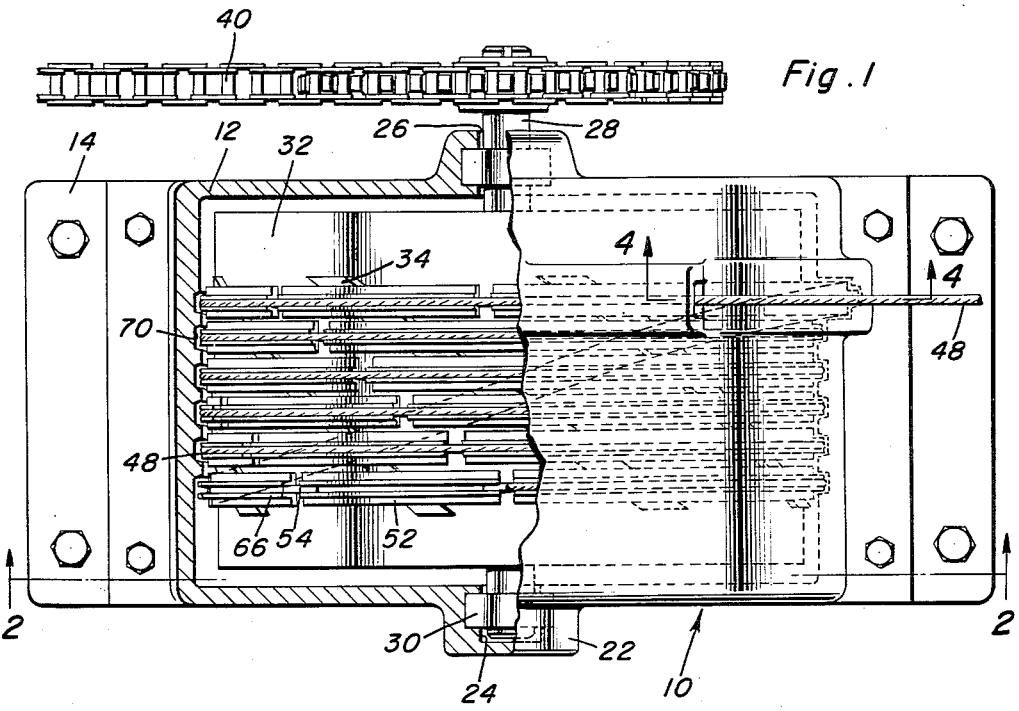
Fig. 1
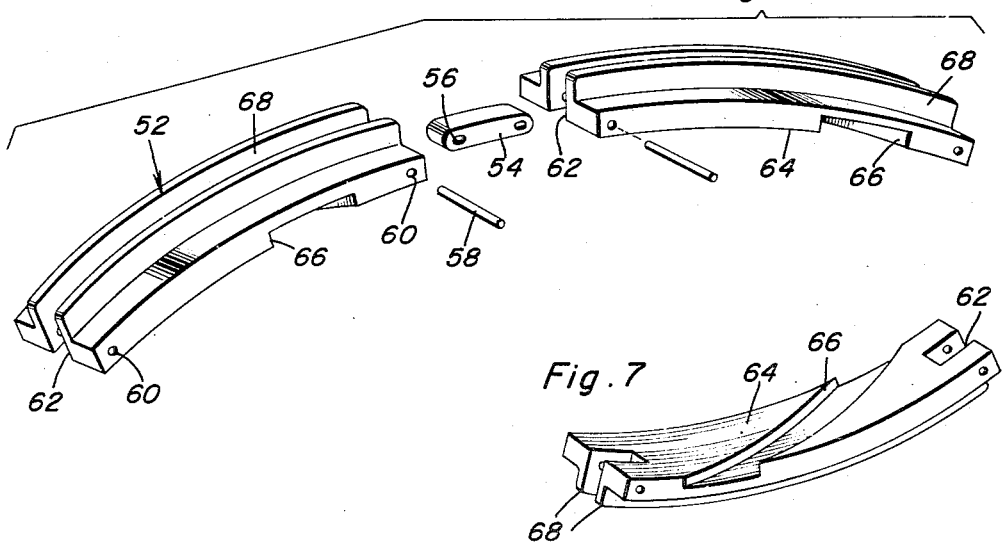
Fig. 6
Fig. 7
Felix I. Stewart
INVENTOR.
BY June 3, 1958 F. I. STEWART 2,836,983
POWERED UNIT FOR ENDLESS CONVEYOR CABLES
Filed Sept. 18, 1956 3 Sheets-Sheet 2

Felix I. Stewart
INVENTOR.

BY *Clarence A. O'Brien*
*and Harvey B. Jackson*
Attorneys

June 3, 1958   F. I. STEWART   2,836,983
POWERED UNIT FOR ENDLESS CONVEYOR CABLES
Filed Sept. 18, 1956   3 Sheets-Sheet 3
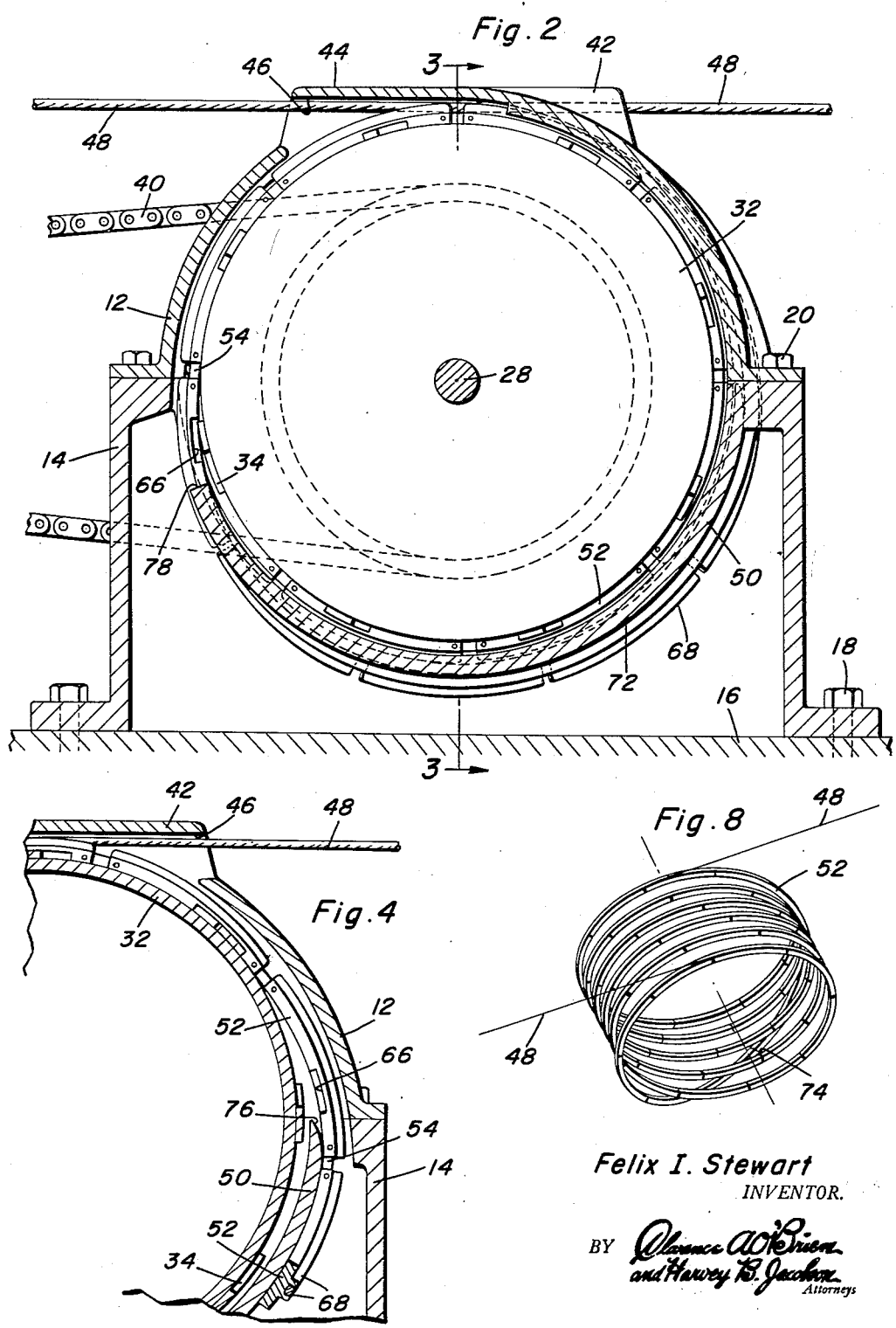
Felix I. Stewart
INVENTOR.

United States Patent Office 2,836,983
Patented June 3, 1958

2,836,983
POWERED UNIT FOR ENDLESS CONVEYOR CABLES

Felix I. Stewart, Huntsville, Ala.

Application September 18, 1956, Serial No. 610,518

10 Claims. (Cl. 74—224)

This invention generally relates to a power unit for an endless conveyor cable including a powered pulley and is an improvement on the device illustrated in my Patent No. 2,706,416 issued April 19, 1955 for Powered Unit for Endless Conveyor Cables.

An object of the present invention is to provide a powered unit for conveyor cables incorporated in a driven pulley of a particular construction which permits the portion of the cable being played off of the drum to be maintained at a constant tension as is the portion of the cable being wound upon the drum, thus providing an endless cable in which some type of supporting mechanism may be moved thereon wherein some mechanism may be provided for shifting the support mechanism across the powered pulley.

A further object of the present invention is to provide a power unit for conveying cables in which the portions of the cable being wound onto and played off of the drum of a pulley are retained in a constant longitudinal relationship by employing slidable travelers movable in response to rotation of the drum for moving portions of the cable transversely of the drum so that the portion being played off of the drum and the portion being wound onto the drum will always be in a constant relationship.

A further object of the present invention is to provide a power pulley in which the cable receiving lugs are in the form of an endless member wherein the lugs, when they have run completely down the length of the pulley, that is, from a position in alignment with the portion of the cable being wound upon the drum to a position in alignment with the portion of the cable being played off the drum, the lugs go outside of the control casing and cross over to the opposite side of the drum or pulley and then enter the casing and are ready to pick up the cable being wound upon the drum or cylinder.

Other objects of the present invention will reside in its simplicity of construction, ease of operation, adaptation for its particular purposes and its relatively inexpensive manufacturing cost.

These together with other objects and advantages which will become subsequently apparent reside in the details of construction and operation as more fully hereinafter described and claimed, reference being had to the accompanying drawings forming a part hereof, wherein like numerals refer to like parts throughout, and in which:

Figure 1 is a plan view of the power unit of the present invention, with portions thereof being broken away;

Figure 2 is a longitudinal, vertical sectional view taken substantially upon a plane passing along section line 2—2 of Figure 1, illustrating further structural details of the device;

Figure 4 is a detailed sectional view taken substantially upon a plane passing along section line 4—4 of Figure 1, illustrating the manner in which the lugs are separated from the casing during a portion of their movement;

Figure 6 is a group perspective view illustrating the construction of the movable slides or lugs;

Figure 7 is a perspective view of the inner surface of one of the lugs of Figure 6; and Figure 8 is a schematic perspective view illustrating the relationship of the interconnected lugs and the crossover thereof, together with the cable being wound thereon and played off of the drum.

Figure 3:
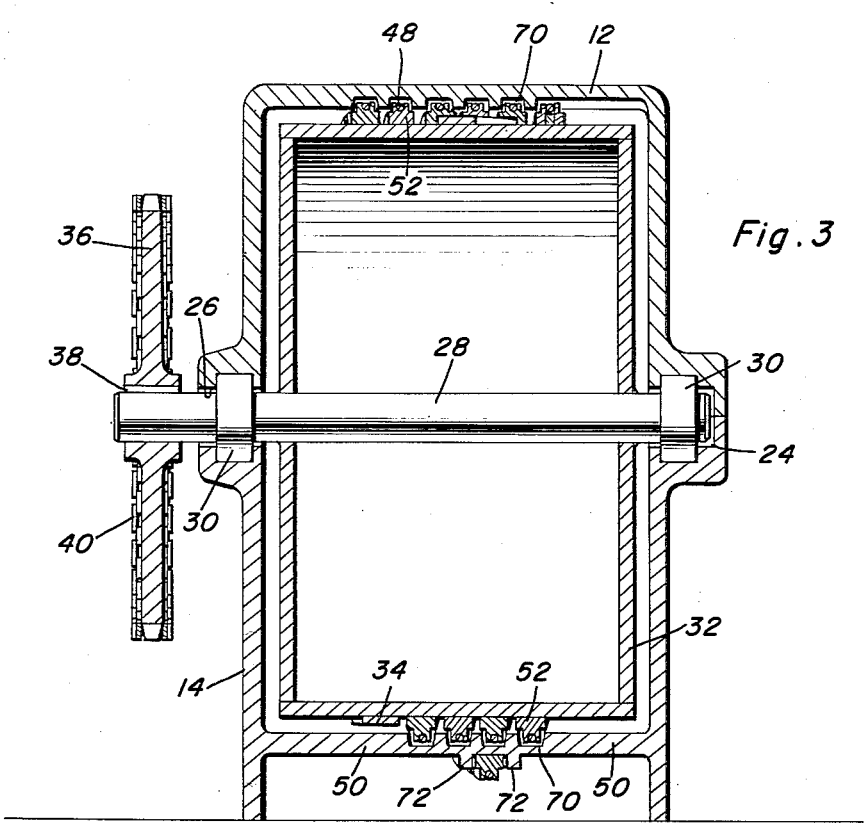
Figure 3 is a transverse, vertical sectional view taken substantially upon a plane passing along section line 3—3 of Figure 2, illustrating the relationship of the rotatable drum and the casing therefor.
Figure 5:
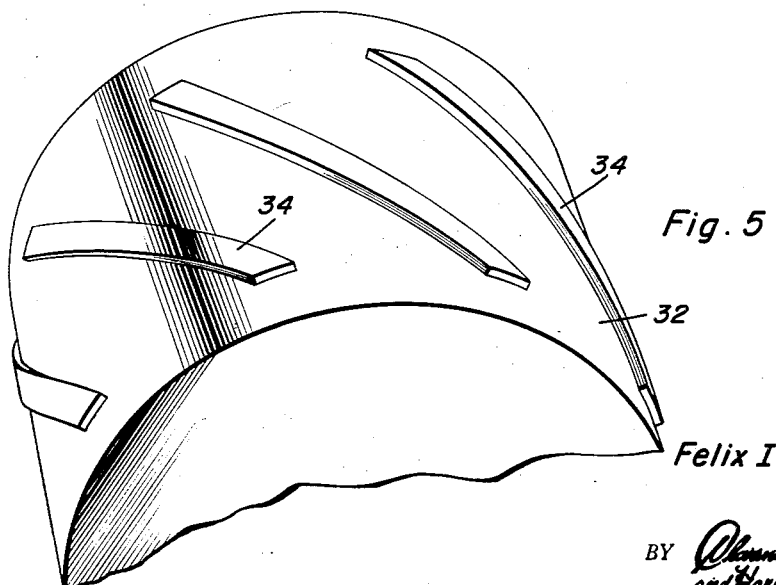
Figure 5 is a partial perspective view of the rotatable drum, illustrating the helical lugs or projections thereon.

Referring now specifically to the drawings, the numeral 10 generally designates the power unit of the present invention which includes a generally semicylindrical casing 12 supported on a supporting base 14 which is bolted to a supporting surface 16 as by bolts 18. The diametric opposed figures of the casing 12 are supported on the base 14 by bolts 20. The casing 12 includes bosses 22, having a socket 24 in one of the bosses 22 and a transverse bore 26 in the other of the bosses 22 for receiving a transverse shaft 28. Suitable bearing members 30 are provided for supporting the shaft 28 in the bosses 22 in a rotatable manner. A generally cylindrical, hollow drum 32 is mounted on the shaft 28 for rotation therewith.

The cylindrical drum 32 is disposed in spaced, concentric relation to the casing 12 and includes a plurality of helical or spiral projections 34 which extend generally longitudinally and curve around a portion of the periphery of the cylindrical drum 32.

Disposed on the end of the shaft 28 and projecting through the aperture 26 is a sprocket gear 36 keyed thereto as by longitudinal key 38, and the sprocket gear 36 has a sprocket drive chain 40 encircling the same and extending to a power device for affecting rotation of the shaft and drum 32. The drive means is not shown and it is pointed out that any suitable drive mechanism may be employed and other types of drive arrangements may be employed, such as a V-belt drive or some positive type drive arrangement wherein the drum 32 is rotated.

The upper portion of the casing 12 is provided with a pair of generally tangentially extending bosses 42 and 44 which are hollow and provide tangentially extending passageways or openings 46 for receiving a cable 48, wherein the cable 48 being wound onto the drum 32 will enter the casing 12 through the boss 44 adjacent one edge of the drum 32, while the cable 48 leaving the drum 32 will leave from the other of the bosses 42 adjacent the other edge of the drum 32.

A generally semicylindrical casing member 50 is disposed below the semicylindrical casing 12 and generally forms a continuation thereof for completely enclosing the rotatable drum 32. The casing member 50 may be rigidly interconnected with the side walls of the base member 14, thus providing a rigid construction.

A plurality of lugs, generally designated by the numeral 52, are interconnected by employing interconnecting links 54 having apertures 56 adjacent each end thereof for receiving a pin 58 inserted through apertures 60 in the adjacent ends of adjacent lugs 52 wherein the ends of the interconnecting link 54 are received in notches 62 in each end of each lug 52. Each of the lugs 52 is generally elongated and is provided with an arcuate inner surface 64 for conforming to the contour of the periphery of the drum 32, and each arcuate surface 64 is provided with a diagonal or spiral groove 66 fitting over the ribs or projections 34 on the drum 32 and sliding from one edge of the drum to the other edge of the drum 32 on the projections 34. The outer surface of each of the lugs 52 is provided with a pair of spaced longitudinal projections 68, which are arcuate as is the entire lug 52, with the inner surface of the area between the longitudinal member 68 forming a seat or groove for receiving the cable 48.

The inner surface of the casing 12 and the casing member 50 is provided with a continuous spiral groove 70 for receiving the longitudinal projections 68, and the groove 70 makes several revolutions from one edge of the casing 12 and casing member 50 to the other edge thereof, substantially in the nature of a screw-thread, thereby causing lateral movement of the lugs 52 when the lugs 52 are rotated with the drum 32, as when the drum 32 would be powered. As illustrated in Figure 8, the lugs 52 are interconnected to form an endless, flexible member, with the lugs underlying the boss 44 receiving the cable 48 being wound upon the drum and forming a groove for receiving the same; whereas the portion of the flexible member disposed under the boss 42 plays off the cable 48 in the same nature as a multi-groove cable pulley.

As illustrated in Figure 3, the casing member 50 is provided with a pair of peripheral projections 72 which are disposed in spaced relation and which are disposed in a spiral manner for receiving therebetween the lugs 52 as they cross over the plurality of spiral convolutions of the lugs on the drum 32. This cross-over portion is designated in Figure 8 by the numeral 74 and it is this portion which is continuously received in between the spiral lugs or projections 72 which form a guide for the movement of the cross-over portion. This provides an endless flexible element forming the grooves for the drum 32, thus receiving the cable 48 thereon whereby the grooves will continuously move laterally from the position directly under the boss 44 to a position directly under the boss 42, after which the lugs will cross over to their initial convolution. For facilitating the cross-over operation, the upper edge of the casing member 50 is provided with an inwardly flared guide edge 76 which removes and guides the lugs 52 off of the drum 32 into the area between the ribs 72. Also, an opening 78 is provided substantially in diametrically opposed relation to the sharpened edge 76, thus permitting the lugs 52 to again come into contact with the drum 32, but at the other edge thereof whereby the projecting lugs or ribs 72 act as a trackway for the passage of this portion of the endless flexible member formed by the plurality of pivotally interconnected lugs 52.

In operation, the drum 32 is rotated by applying power thereto through the chain 40 and sprocket gear 36 or by any other suitable drive mechanism. The cable 48 is wound onto the drum from the left-hand side of Figures 1 and 2 and played off of the drum from the right-hand side thereof when the drum 32 is rotated in a clockwise manner. Rotation of the drum 32 causes the lugs 52 to move with the drum 32, and due to the engagement of the member 68 in the spiral groove 70 having a plurality of convolutions, the lugs 52 will be moved laterally as guided by the projecting ribs 34. Thus, cable entering the boss 44 and being wound upon the drum 32 will be driven and also moved laterally into alignment with the boss 42, thus permitting entry and exit of the cable 48 in a tangential manner, and due to the series of winds of cable along the drum, the tension of the entering and exiting cable will be substantially the same. The lugs 52 being interconnected to form an endless member cross over from a position under the discharge boss 42 to a position underlying the entrance boss 44 by passing outwardly to the exterior surface of the casing member 50 and being disposed in the spiral trackway formed by the projections or ribs 72, thus providing a continuous operation which permits the lengths and generally the sizes of the lugs to be varied with no alteration to the device, inasmuch as the cable areas may be enlarged without changing the relative proportions of the elements of the device.

The specific structure illustrated is for the purposes of describing the invention and it is pointed out that the details of the structure may be altered. As an example, the groove 66 on the lugs 52 may be reversed in relation to the projections 34 on the drum 32, that is, the drum may be provided with diagonal grooves and the lugs may be provided with projections slidably disposed in the grooves.

The foregoing is considered as illustrative only of the principles of the invention. Further, since numerous modifications and changes will readily occur to those skilled in the art, it is not desired to limit the invention to the exact construction and operation shown and described, and accordingly all suitable modifications and equivalents may be resorted to, falling within the scope of the invention as claimed.

What is claimed as new is as follows:

1. A powered unit comprising a hollow casing, a drum rotatable within said casing, means for driving said drum, a plurality of pivotally interconected lugs mounted on said drum for transverse sliding movement, said lugs forming an endless flexible member, means on the exterior surface of the lugs for receiving a cable, means on said lugs for engaging the inner surface of the casing for guiding the movement of the lugs on the drum, cross-over means for said lugs whereby the lugs may return to a position for receiving additional cable, each of said lugs being provided with a diagonal groove on the inner surface thereof, said drum having a plurality of diagonal projecting ribs thereon for guiding the lateral movement of the lugs on the drum.

2. A powered unit comprising a hollow casing, a drum rotatable within said casing, means for driving said drum, a plurality of pivotally interconected lugs mounted on said drum for transverse sliding movement, said lugs forming an endless flexible member, means on the exterior surface of the lugs for receiving a cable, means on said lugs for engaging the inner surface of the casing for guiding the movement of the lugs on the drum, cross-over means for said lugs whereby the lugs may return to a position for receiving additional cable, each of said lugs being provided with a longitudinal projection riding in a spiral groove in the casing for assuring lateral movement of the lugs upon rotation of the drum.

3. A powered pulley unit for a conveyor cable comprising a cylindrical drum, power means for rotating said drum, support means for supporting said drum, a casing enclosing said drum in concentric spaced relation, said casing being mounted on support means and having opposed openings adjacent opposite ends thereof for receiving a cable being wound upon the drum from one direction and played off the drum in the opposite direction, movable lug means mounted on said drum for movement across the periphery thereof, means interconnecting the lug means and the drum for guiding the movement of the lug means, means on the lug means for receiving the convolutions of the cable wound upon the drum, and means interconnecting the lug means and the casing for moving the lug means across the periphery of the drum when the drum is rotated.

4. A powered pulley unit for a conveyor cable comprising a cylindrical drum, power means for rotating said drum, support means for supporting said drum, a casing enclosing said drum in concentric spaced relation, said casing being mounted on support means and having opposed openings adjacent opposite ends thereof for receiving a cable being wound upon the drum from one direction and played off the drum in the opposite direction, movable lug means mounted on said drum for movement across the periphery thereof, means interconnecting the lug means and the drum for guiding the movement of the lug means, means on the lug means for receiving the convolutions of the cable wound upon the drum, and means interconnecting the lug means and the casing for moving the lug means across the periphery of the drum when the drum is rotated, said lug means including a plurality of pivotally interconnected arcuate lugs forming an endless flexible member having a plurality of convolutions for receiving a plurality of convolutions of the cable, and means on the casing for guiding a portion of one convolution of the flexible member to cross over the other convolutions so as to return to an initial position.

5. The combination of claim 4 wherein each arcuate lug is provided with a diagonal groove in the inner surface thereof, said drum having a plurality of diagonal projections on the periphery thereof for engagement with the grooves for guiding the movement of the lugs and forming a driving connection between the lugs and drum.

6. The combination of claim 4 wherein each of said lugs includes a pair of arcuate longitudinal upstanding projections on the outer surface thereof, said projections being disposed in spaced parallel relation and defining a groove therebetween with a curved bottom for receiving the cable.

7. The combination of claim 6 wherein said casing is provided with a spiral peripheral groove on the inner surface thereof with said groove having a plurality of convolutions, said longitudinal projections on said lugs being slidably received in said spiral groove whereby movement of the lugs with the drum will cause movement across the drum with said movement being guided by the projections on the drum, the groove in the casing and the projections on the lugs constituting the interconnecting means between the casing and the lug means.

8. The combination of claim 7 wherein said casing is provided with diametric opposed openings adjacent the horizontal center thereof, a spiral trackway formed on the external surface of the lower half of the casing between the opposed openings, said opposed openings being arranged adjacent opposite ends of the casing, the ends of said trackway being rounded for guiding the interconnected lugs from engagement with drum into the trackway and into engagement with the outer surface of the lower half of the casing, said trackway constituting the means for guiding a portion of one convolution of the flexible member to cross over the other convolutions.

9. The combination of claim 7 wherein each arcuate lug is provided with a diagonal groove in the inner surface thereof, said drum having a plurality of diagonal projections on the periphery thereof for engagement with the grooves for guiding the movement of the lugs and forming a driving connection between the lugs and drum.

10. A pulley unit for a flexible line comprising a power drum, a plurality of pivotally interconnected lugs forming an endless flexible member having a plurality of convolutions engaged with the drum, means on the lugs for receiving a plurality of convolutions of the flexible line, means forming a crossover for one convolution of the flexible member whereby the flexible member may operate continuously on said drum, guide means interconnecting the drum and lugs for guiding the lateral movement of the lugs on the drum and for interlocking the drum and lugs throughout the length of the flexible member except for the cross-over portion, and means for urging the lugs laterally during movement of the drum.

References Cited in the file of this patent

UNITED STATES PATENTS

| | | |
|---|---|---|
| 750,920 | Wagner | Feb. 2, 1904 |
| 2,706,416 | Stewart | Apr. 19, 1955 |